Nov. 18, 1947.   N. F. BLACK ET AL   2,430,972
BUTADIENE EXTRACTION
Filed Jan. 10, 1945
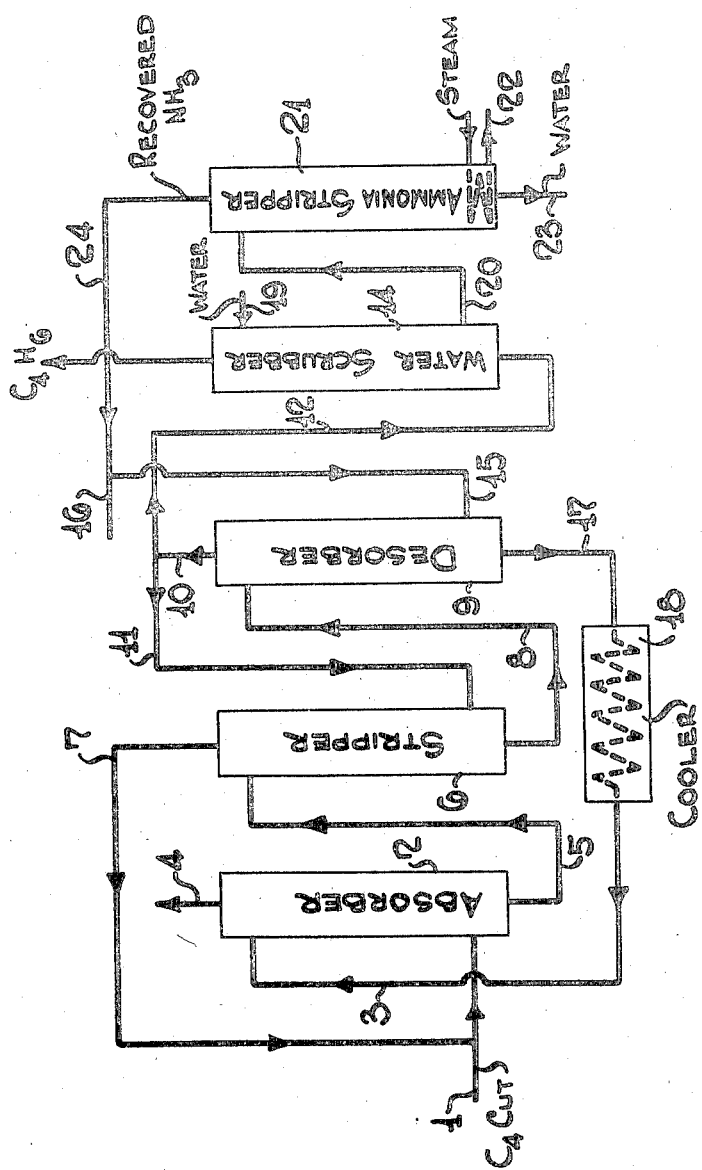
Norman F. Black
Louis E. Pirkle   Inventors
By ………… Attorney Patented Nov. 18, 1947

2,430,972

UNITED STATES PATENT OFFICE 2,430,972

BUTADIENE EXTRACTION

Norman F. Black and Louis E. Pirkle, Baton Rouge, La., assignors to Standard Oil Development Company, a corporation of Delaware Application January 10, 1945, Serial No. 572,189

6 Claims. (Cl. 260—681.5)

This invention relates to improvements in the separation and segregation of diolefins from hydrocarbon mixtures containing diolefins and other hydrocarbons.

Diolefins are found in the hydrocarbon mixtures that are produced and generally contain monoolefins, paraffins and other hydrocarbons together with the diolefins. It is very difficult to separate the diolefins from the other hydrocarbons as the boiling ranges vary only from 1 or 2° C. Various methods have been proposed for the separation of the diolefins from the hydrocarbon mixtures, for example, by the use of monoethanol amine cuprous chloride absorbents, sulfur dioxide absorbents, slurries of cuprous chloride with ammonium chloride, etc. The use of these solutions has several serious drawbacks such as corrosion of steel, instability of the absorbent, low selectivity, low capacity, etc.

An object of this invention is to provide a stable non-corrosive absorbent that may be used in steel equipment and which will selectively separate the diolefins from the hydrocarbon mixture containing diolefins together with other hydrocarbons such as monoolefins, paraffins, etc., and from which solution diolefins of 98% purity or better can be recovered.

According to this invention it has been found that high ammonia concentrations are very effective in preventing precipitation of acetylenes which a cuprous solution may extract from a hydrocarbon fraction having four carbon atoms to the molecule. It has been found that a solution containing 10½ to 11 mols of ammonia per liter can tolerate a much higher concentration of acetylenes in the feed than a solution containing only about 9 mols of ammonia per liter. It is very undesirable to have any copper acetylides precipitate in the absorber or in any other part of the absorption system as the copper acetylides when dried may explode.

Basic ammoniacal cuprous solutions of high copper content, 2 to 5 mols of copper per liter and 10 to 11 mols of total ammonia, are especially suitable for diolefin extraction in steel equipment. The copper and ammonia in this solution are combined with an anion that forms a cuprous salt soluble in ammoniacal solutions, for example acetate, lactate, tartrate, formate and glycolate, etc. The preferred concentration of copper is about 3 mols per liter as it has been found that copper solutions containing smaller quantities of copper are not suitable for use in steel.

It has likewise been found that the strongly basic ammoniacal cuprous salt solutions, for example in ammoniacal cuprous acetate solutions having a pH value in the range of 9 to 11 and containing cupric ions exert a remarkable passivity toward metallic iron, in that no reaction occurs between cupric ions and metallic iron or steel, whereas in the absence of traces of cupric copper even in these strongly basic solutions, cuprous ions react vigorously with steel. Ammoniacal cuprous acetate solutions of low copper content are easily reduced to the extremely corrosive 100% cuprous state, and are therefore not suitable for use in steel equipment.

Another advantage in using a high copper ammoniacal cuprous acetate solution is in the high absorption capacity for butadiene and improved butadiene selectivities over these solutions of the low ammoniacal content. The preferred solution contains about 3.2 mols of copper of which the cuprous content is 3 mols, the cupric content 0.2 mol and the total ammonia 10½ to 11 mols, acetic acid 4 mols and the balance water and possesses a pH value of about 10.5 to 12.5.

In carrying out this process, it has been found that the ammoniacal cuprous acetate solution containing over 10 mols of ammonia per liter, when contacted with the hydrocarbon mixture tends to lose a part of the ammonia due to its high vapor pressure in such concentrated solutions. Likewise the hydrocarbon mixtures as they are separated carry off a portion of the ammonia mechanically. The loss of the ammonia tends to materially reduce the selectivity and the capacity of the residual ammoniacal cuprous acetate solution.

According to this invention, this is compensated by the further addition of ammonia to the ammoniacal cuprous acetate solution as the butadiene is being desorbed therefrom and before it again contacts the hydrocarbon mixture containing the diolefins. The ammonia which is contacted with this hydrocarbon mixture may be that which was recovered from the hydrocarbons although fresh ammonia may be continuously added to the absorption solution during the desorption of butadiene and before the solution is again contacted with the hydrocarbon mixture containing the diolefins.

The process may be better understood from the following detailed description with reference to the accompanying drawing which is a schematic flow diagram illustrating one specific mode of practicing the present invention.

A mixture of hydrocarbons, for example, a fraction containing hydrocarbons having 4 carbon atoms to the molecule is passed through pipe 1 into absorber 2 where it is passed in countercurrent flow to an absorbent solution containing about 3.2 mols of copper per liter of which the cuprous content is 3 mols and the cupric content 0.2 mol, 10½ to 11 mols of total ammonia, 4 mols of acetic acid and the balance water, the ammoniacal cuprous acetate solution having a pH value of about 9 to 13, preferably 10.5 to 12.5. This ammoniacal cuprous acetate solution is introduced into the upper part of absorber 2 by means of pipe 3. The unreacted hydrocarbons are removed from the absorber by means of pipe 4 and the ammoniacal cuprous acetate solution with the absorbed olefins is removed through pipe 5 and passed into the upper part of stripper 6 where the temperature is raised sufficiently high to remove substantially all of the butenes and a small fraction of butadiene through pipe 7 where they are recycled to pipe 1 and to the absorber 2. The residual ammoniacal cuprous acetate solution is removed through pipe 8 and passed to desorber 9 where it is heated to a higher temperature to expel all of the diolefins from the solution, which diolefins are removed from desorber 9 by means of pipe 10 and are divided into two parts, one part passing through pipe 11 to stripper 6 and used to strip some of the olefins from the ammoniacal cuprous acetate solution in stripper 6 and the remaining part passing through pipe 12 into water scrubber 14, ammonia being added to lower part of desorber 9 by means of pipe 15 to maintain a concentration of ammonia in said desorber of about 11 mols of total ammonia and a pH value of about 9 to 13, preferably 10.5 to 12.5. This ammonia may be fresh ammonia introduced through pipe 16 or ammonia that has been recovered in the process. The ammoniacal cuprous acetate solution is removed from desorber 9 by means of pipe 17 and passed through cooler 18 into pipe 3. The diolefins are passed in countercurrent flow in water scrubber 14 where water is introduced into the upper part of the scrubber by means of pipe 19, the water being removed by means of pipe 20 and passed to ammonia stripper 21 where sufficient heat is added by heating unit 22 to drive off the ammonia through pipe 24, the residual water being removed from the ammonia stripper 21 through pipe 23.

What we claim is:

1. Improvement in desorbing a diolefin from an ammoniacal cuprous salt solution having addition compounds of the cuprous salt and a diolefin therein which comprises desorbing the diolefin while adding sufficient free ammonia to the solution undergoing desorption to maintain the ammoniacal cuprous salt solution at a concentration of about 11 mols of total ammonia per liter and a pH value of about 9 to 13.

2. Improvement in the separation and concentration of a diolefin from hydrocarbon mixture which comprises contacting a hydrocarbon mixture containing a diolefin with an ammoniacal cuprous solution containing at least 10 to 12 mols of ammonia per liter and an anion that forms a cuprous salt soluble in the ammoniacal solution, separating the ammoniacal cuprous solution and adding sufficient free ammonia to the solution undergoing desorption to maintain an ammonia concentration in the ammoniacal cuprous solution of about 11 mols of ammonia per liter while continuously desorbing the diolefin.

3. Improvement in the separation and concentration of a diolefin from a hydrocarbon mixture which comprises contacting a hydrocarbon mixture containing a diolefin with an ammoniacal cuprous acetate solution containing at least 10 to 12 mols of ammonia per liter, separating the ammoniacal cuprous acetate solution and separately recovering a diolefin by heating said solution to liberate a gas mixture comprising said diolefin and ammonia, while adding to the solution being heated sufficient free ammonia to maintain an ammonia concentration in the ammoniacal cuprous acetate solution of about 11 mols of ammonia per liter and a pH value of about 10.5 to 12.5.

4. Improvement in the separation and concentration of a diolefin from a hydrocarbon mixture which comprises contacting a hydrocarbon mixture containing a diolefin with a solution having a cuprous content of 3 mols, a cupric content of 0.2 mol, 10½ to 11 mols of total ammonia, 4 mols acetic acid and the balance water to make a liter, separating the said solution and separately desorbing a diolefin by heating said solution, while adding thereto sufficient free ammonia to maintain in the heated solution an ammonia concentration of about 11 mols per liter.

5. Improvement in separation and concentration of a diolefin according to claim 3 in which the ammonia concentration is maintained by recycling a part of ammonia that is desorbed with the diolefin and recovered from the said mixture of ammonia and diolefin.

6. Improvement in the separation and concentration of a diolefin according to claim 4 in which the diolefin is butadiene.

NORMAN F. BLACK.
LOUIS E. PIRKLE.

REFERENCES CITED

The following references are of record in the file of this patent:

UNITED STATES PATENTS

| Number | Name | Date |
| --- | --- | --- |
| 1,977,659 | Watts | Oct. 23, 1934 |
| 2,154,676 | Haeuber et al. | Apr. 18, 1939 |
| 2,275,135 | Fasce | Mar. 3, 1942 |
| 2,369,559 | Gilliland | Feb. 13, 1945 |
| 2,383,784 | Fleer | Aug. 28, 1945 |